UNITED STATES PATENT OFFICE.

WILLIAM A. TORREY, OF MONT CLAIR, NEW JERSEY.

IMPROVEMENT IN THE MANUFACTURE OF BELTING, HOSE, &c.

Specification forming part of Letters Patent No. 56,292, dated July 10, 1866.

*To all whom it may concern:*

Be it known that I, WILLIAM A. TORREY, of Mont Clair, in the county of Essex and State of New Jersey, have invented a new and useful improvement in the manufacture of articles made by the application of india-rubber, gutta-percha, and other vulcanizable gums, such as belting, hose, packing, and the like; and I do hereby declare that the following is a full and exact description thereof.

Belting, hose, packing, and like articles have heretofore been manufactured by the application of compounds prepared for vulcanization in which either india-rubber or gutta-percha has been the principal ingredient. When made of a compound having india-rubber as its principal ingredient they are not only injuriously affected by the atmosphere in hot weather and exposure to all artificial heats in their various uses, but are also liable to be injured and destroyed by oils, alkalies, acids, and like chemicals. When manufactured of a compound having gutta-percha as its principal ingredient they lack the requisite elasticity and crack.

The nature of my invention consists in applying both of these compounds separately, preserving the elastic quality required in belting, hose, packing, and like articles, and protecting them against the injurious operations of heat, oils, alkalies, acids, &c.

To enable others skilled in the art to use and make my invention, I will proceed to describe it.

Both the india-rubber and gutta-percha gums are prepared and compounded for the vulcanizing process in the manner well known to persons skilled in the art of preparing such gums for that purpose, each gum being separately so prepared. Then I form the belting or hose in the usual manner—that is to say: For belting spread evenly and thinly on one side of strips of cloth the compound of which india-rubber forms the principal ingredient, folding or laying one strip of the cloth thus covered over the other until the required strength and body is attained; then coat the outer surfaces of the belting thus formed with a thin layer of the gutta-percha compound, and vulcanize the whole by applying the same degree of heat as is now applied in vulcanizing the ordinary india-rubber belting.

Hose are also made in the usual manner—that is, spread the india-rubber compound thinly and evenly on one side of cloth, and wind round a mandrel or core, one layer over another, until the required thickness and strength are attained. Before commencing the operation of winding, however, spread a thin coating of the gutta-percha compound on the side of the cloth which is to come into immediate contact with the core or mandrel to a distance sufficient to go at least once around it, the mandrel or core being previously covered with pulverized soap-stone to prevent the compound adhering to it; and if the hose is required to be used where it will be exposed to more than ordinary heat, coat its outer surface also with the gutta-percha compound; then vulcanize the same as above.

Packing and, indeed, all other articles requiring an elasticity and protection from the effects of the above-named and like chemicals and heated atmosphere may be treated in the same or similar manner.

What I claim as my invention, and desire to secure by Letters Patent, is—

In the manufacture of belting, hose, packing, and like articles, the combining and applying of the india-rubber and gutta-percha compounds substantially in the manner and for the purposes above set forth.

WILLIAM A. TORREY.

Witnesses:
PETER VAN ANTWERP,
ANDREW VAN ANTWERP.